United States Patent [19]

Nissen

[11] Patent Number: 4,835,185
[45] Date of Patent: * May 30, 1989

[54] IMMUNOMODULATOR FOR IMPROVING COMMERCIAL PERFORMANCE OF DOMESTIC ANIMALS

[75] Inventor: Steven L. Nissen, Ames, Iowa

[73] Assignee: Iowa State University Research Foundation, Inc., Ames, Iowa

[ * ] Notice: The portion of the term of this patent subsequent to Jul. 19, 2005 has been disclaimed.

[21] Appl. No.: 20,607

[22] Filed: Mar. 2, 1987

Related U.S. Application Data

[63] Continuation-in-part of Ser. No. 838,357, Mar. 11, 1986, Pat. No. 4,760,090, and Ser. No. 838,356, Mar. 11, 1986, Pat. No. 4,758,593, and Ser. No. 838,355, Mar. 11, 1986, Pat. No. 4,764,531.

[51] Int. Cl.$^4$ ............................................... A61K 31/19
[52] U.S. Cl. .................................................... 514/557
[58] Field of Search .......................................... 514/557

[56] References Cited

U.S. PATENT DOCUMENTS

| | | | |
|---|---|---|---|
| 4,100,161 | 7/1978 | Walser | 424/274 |
| 4,100,293 | 7/1978 | Walser | 424/274 |
| 4,677,121 | 6/1987 | Walser et al. | 424/561 |

OTHER PUBLICATIONS

Sapir et al., (1977), Metabolism, 26:301-308.
Walser, (1983), New Aspects of Clinical Nutrition, pp. 319-324, "Nitrogen-Sparing Effects of Branched Chain Ketoacids", (Karger, Basel).
Boebel et al., (1982), J. Nutr., 112:1929-1939.
Abras et al., (1982), Kidney International, 22:392-397.
Walser, (1984), Clinical Science, 66:1-15, Editorial Review, "Therapeutic Aspects of Branched-Chain Amino and Keto Acids".
Chawla et al., (1975), J. Nutr., 105:788-80.
Chow and Walser, (1974), J. Nutr., 104:1208-1214.

*Primary Examiner*—Frederick E. Waddell
*Attorney, Agent, or Firm*—Tilton, Fallon, Lungmus & Chestnut

[57] ABSTRACT

The commercial performance of domestic animals is improved by feeding keto-isocaproate (KIC) in a form nutritionally utilizable by the animals. The KIC enhances blastogenesis of the animal's T-lymphocytes and reduces plasma cortisol levels. The result is a favorable effect on the immune function of the animal, and can be used to counteract stress-associated immunosuppression. The method is applicable to beef cattle, dairy cattle, sheep, goats, swine, and poultry, as raised, respectively, for meat, milk, wood, or egg production. Practical benefits may also include increased rates of gain and reduced cholesterol in meats and eggs, and increased milk, wool, and egg yields.

10 Claims, No Drawings

IMMUNOMODULATOR FOR IMPROVING COMMERCIAL PERFORMANCE OF DOMESTIC ANIMALS

FIELD OF INVENTION

The field of this invention is methods for improving the commercial performance of domestic animals. The invention is particularly concerned with the administration of alphaketoisocaproate (KIC) to domestic animals for improving the immune and/or metabolic functions of the animals.

RELATED APPLICATIONS

This application is a continuation-in-part of copending application Ser. Nos. 838,357, 838,356, and 838,355, all filed Mar. 11, 1986, now U.S. Pat. Nos. 4,760,090, 4,758,593 and 4,764,531, respectively.

BACKGROUND OF INVENTION

Keto analogs of essential amino acids have been proposed for use in human nutrition as partial or complete substitutes for the corresponding amino acids, including, for example, leucine, isoleucine, methionine, phenylalanine, and valine. Originally, the use of such keto analogs was proposed by Dr. MacKenzie Walser as supplementation to protein-reduced diets in uremia. See, for example, Walser, et al., *J. Clin. Inv.* (1973) 52: 678–690. Further experiments by Walser and associates demonstrated a nitrogen sparing effect from mixtures of branched-chain keto acids. Saiper and Walser, *Metabolism* (1977) 26: 301–308. Patents have issued to Walser on the use of keto analogs of essential amino acids for promotion of protein synthesis and suppression of urea formation in humans. (U.S. Pat. Nos. 4,100,161 and 4,101,293). A recent review summarized existing knowledge with respect to the administration of branched-chain keto acids to humans. "New Aspects of Clinical Nutrition", pp. 319–324 (Karger, Basel, 1983).

The keto acid analog of L-leucine is alpha-ketoisocaproate (KIC) which is also sometimes referred to as "keto-leucine". KIC does not have L and D forms as does leucine. It is known that there is an interconversion of KIC and leucine in tissues. Published studies have demonstrated that KIC can be substituted in animal diets for leucine providing that larger molar amounts of KIC are used.

Chawla, et al. reported that weight loss by rats being fed a diet deficient in leucine could be prevented by adding equimolar amounts of KIC to the diet. *J. Nutr.* (1975) 105: 798–803. Other studies in rats have demonstrated that KIC is utilized less efficiently than leucine. Boebel et al. reported that the efficiency of KIC was only about 56% with reference to leucine. Boebel and Baker, *J. Nutr.* (1982) 112: 1929–1939. Chow et al. obtained similar results, reporting that substitution of KIC for leucine reduced feed efficiency by approximately 33%. Chow and Walser, *J. Nutr.* (1974) 104: 1208–1214.

Walser and associates have published a study of the oral dosing of KIC to rats in which an increased efficiency of utilization of nitrogen and minerals was apparently observed. Abras and Walser, *Am. J. Clin. Nutr.* (1982) 36: 154–161. Prior to the present invention, there are no known reports describing the feeding of KIC to domestic animals.

KIC has not been heretofore known as an immunomodulator in humans or animals, nor has it been suggested that KIC can be used to reduce plasma cortisol (hydrocortisone), or that it can be used to favorably alter immune function by enhancing blastogenesis of T lymphocytes.

It is known that in cattle stress-induced immunosupression is accompanied by increased plasma cortisol concentrations. Roth, Chap. 13, pages 225–243, in "Animal Stress" (published by Amer. Physiol. Soc., 1985). Such stress-induced immunosuppression can occur in other domestic animals. It can result from a wide variety of stresses, such as handling, shipping, injury, etc. However, this problem is particularly acute with cattle. Bovine respiratory disease complex, commonly known as "shipping fever", is recognized as a stress-associated condition. See Roth, above cited, pages 226–227. Considerable research has been devoted to finding ways of combating cattle shipping fever. See, for example, Kaeberle, et al., *Immunopharmacology* (1984), 8: 129–136; and Roth, et al., *Immunopharmacology* (1984), 8: 121–128.

It is known that T lymphocytes have important functions in immunological defense against microorganisms. See, for example, Williams et al., "Hematology", Chap. 102, pages 927–928 (2nd Ed., 1977, McGraw-Hill). In their immune function, T lymphocytes, which are normally quiescent, undergo mitosis with accelerated DNA production. Williams, et al., above cited, pages 882–884. This process of T lymphocyte activation is known as blastogenesis. The degree of blastogenesis activation of T lymphocytes can be determined in vitro using mitogens. The most commonly employed mitogens for this purpose are phytohemagglutin (PHA), pokeweed mitogen (PWM), and concanavalin A (conA). Williams et al., cited above, pages 895, and 923.

SUMMARY OF INVENTION

The present invention provides a novel method and novel feed compositions for improving the commercial performance of domestic animals. The method utilizes alpha-ketoisocaproate (KIC) as an immunomodulator for improving immune function, and/or as a nutrient additive for improving metabolic function. It has been discovered that the administration of KIC favorably alters immune function, as evidenced by enhanced blastogenesis of the T lymphocytes. A further effect on immune function is the marked reduction of plasma cortisol. The enhancement of lymphocyte blastogenesis is of value in increasing disease resistance. Reduced plasma cortisol is expected to be ameliorating in counteracting stress associated immunodepression in domestic animals, and should be useful for controlling cattle shipping fever.

It is not known to what extent the beneficial effects on immune function are related to the beneficial effects on metabolic function. However, it has been found that both immune and metabolic functions can be improved concurrently by feeding KIC-containing feeds. Thus, in the case of animals being raised for meat production, such as young cattle and sheep, young chickens, and veal calves, KIC can be used as a "growth promotant immunomodulator"—an unprecedented kind of feed additive.

Improved metabolic function can also be obtained with mature animals, including dairy cattle, wool-producing sheep, and laying chickens. The production of milk, wool, and eggs can be improved, while at the same time increasing the disease resistance of the animals. With nursing domestic mammals, such as cattle, sheep, and hogs, the improvement in the quality and quantity of the milk benefits the offspring. A further benefit is that the nursing mother mammals are more disease resistant.

The administration of KIC to cattle prior to shipment is expected to mitigate the stress-related effects of shipping fever. By administering the KIC in feed for several days prior to shipment, and then continuing the KIC feeding after shipment, it should be possible to at least partially offset the weight loss associated with shipping stress.

DETAILED DESCRIPTION

For the purposes of the present invention, the KIC should be in a nutritionally-utilizable form. For incorporation in feeds, the KIC should be absorbable in the digestive system, while for parenteral administration a water-soluble form is preferred. For example, it may be used in its free acid form, but its sodium, potassium, ammonium, or calcium salts are preferred. Ammonium and alkali metal salts are more water-soluble, while alkaline earth metal salts such as calcium salt are less water-soluble. These differences in solubility do not appear significant in feeding ruminants such as cattle and sheep. For ruminants, it has been found that the calcium salt is generally comparably effective with the sodium salt, and may have some advantage by dissolving more slowly in rumen fluid. For non-ruminant mammals and poultry sodium KIC is preferred, but other less soluble salts can be used by increasing the amount administered.

Alpha ketoisocaproate (KIC) is available commercially or can be synthesized by known procedures. KIC in the form of its sodium or calcium salts can be purchased from SOBAC, 335 Rue Saint Honore, Paris, France, and/or through Sigma Chemical Company, St. Louis, Mo.

Sodium and calcium salts of KIC as supplied commercially are substantially pure compounds and are in the form of dry powders. However, high purity is not necessarily required for the purposes of the present invention.

KIC powders can be mixed with dry feeds, or for non-ruminant mammals and poultry water-soluble KIC salts can be administered by dissolving in drinking water. For parenteral administration, such as intramuscular injection, sodium KIC can be dissolved in a sterile water. For feed use to assure administration at a desired level, it is preferred to mix the dry KIC salt with the dry feed ingredients at a predetermined concentration. The KIC salt can be incorporated by dry blending using standard mixing equipment. The KIC should be substantially uniformly distributed throughout the feed. After mixing, if desired, the feed material may be further processed, such as by conversion to pellets.

Most feed compositions are composed of mixtures of feed ingredients. Such mixed feed compositions may comprise complete feeds or feed concentrates. It has been found preferable in promoting metabolic function with KIC to use only limited quantities of proteinaceous feed ingredients which are high in leucine content. Such feed ingredients include blood meals, which may contain 16 to 20% leucine, and corn gluten metal containing 18 to 20% leucine (based on the protein dry weight). In contrast, soybean meal contains only about 8 to 9% leucine, and can therefore be used as a carrier for KIC in the form of a protein supplement.

For the metabolic improvement purpose of the present invention, it is believed desirable to limit the amount of leucine in the diet to over 12% of the dry weight of the total protein being consumed by the animal. The amount of protein can be calculated by determining nitrogen and multiplying by a standard conversion factor of 6.25 (viz. N×6.25). In preferred embodiments, the amount of leucine is limited to less than 10% by weight of total protein. Consequently, in the formulation of complete feeds or feed concentrates which are to provide a major portion of the animal's diet, it is preferred to maintain the leucine content of the feed composition to not over 12% and preferably less than 10% (based on total protein). The immune function improvement of KIC, however, can still be obtained at higher leucine levels.

Broadly stated, the method of this invention can comprise orally administering from as low as 0.5 to 2 milligrams (mg) up to as much as 500 to 1000 mg of alpha-ketoisocaproate (KIC) per kilogram of body weight per 24 hours (hrs). (The amounts of KIC are referenced to sodium KIC or molar equivalents of other KIC compounds.) In certain preferred embodiments, the amount of KIC administered to the animals can range from 1 to 100 mg (Na KIC basis) per kg body weight per 24 hrs. For purposes of the present application, the amounts of KIC should be understood to relate to the sodium salt of KIC as the weight basis, or to a molar equivalent amount of the calcium salt or other salts or derivatives, which are nutritionably absorbable and utilizable.

When KIC is combined with the feed material as a uniform admixture, and the feed composition provides the major protein source for the diet, the amount of KIC may be specified in relation to the feed composition. For example, the admixed feed composition may contain from as low as 0.01 to 0.1 up to 1.5 to 2.0 wt. % KIC (Na KIC dry feed weight basis). Such feed compositions will usually contain at least 10% protein and may contain up to 24% protein N×6.25).

While the method of this invention is generally applicable to domestic animals, for optimum results it is desirable to adapt the amounts of KIC administered in the feed compositions for the particular animal species, and to the purpose for which they are being raised.

In feeding KIC to ruminants, protection of the KIC against rumen destruction is desirable. The following sections will discuss specific applications of the invention and preferred procedures. However, it should be understood that the invention is generally applicable to domestic animals, and that the general information set out above is applicable.

Ruminants

In the feeding of cattle, including beef cattle, dairy cattle, growing sheep raised for meat production, and mature sheep for wool production, it would be necessary to employ much larger amounts of KIC since it is subject to rumen destruction. Tests indicate that as much as 90-95% of the KIC may be lost. It is therefore very desirable to protect the KIC against rumen destruction. For example, KIC tablets may be coated with animal blood or with corn protein (zein). A specific protection procedure using zein is described in Example VI. Other proteins can be employed as coating materials which are resistant to rumen breakdown. Polymer coating may also be used such as those known to protect protein against rumen destruction. (See the rumen-protection coatings described in the U.S. Pat. Nos.

4,181,708, 4,181,709, and 4,181,710). The coating employed should be one which is resistant to the mildly acid environment of the rumen while dissolving in the more acid environment of the abomasum. The amount of KIC required can be monitored by increasing the dosage until an appreciable reduction in plasma cortisol is observed.

When the KIC is fed to ruminants in rumen-protected form, a useful range is from 1 to 100 mg KIC per kg body weight per 24 hrs (Na KIC basis). In a substantially fully protected form, the amount administered can be from 2 to 50 mg KIC per kg body weight per 24 hours (NaKIC basis). Feed compositions containing such rumen-protected KIC and comprising substantially the entire diet of the ruminants may contain 0.1 to 0.5% KIC (NaKIC and feed dry weight basis). If unprotected KIC is used these amounts should be increased by a factor of 9 to 10.

KIC-feeding is especially useful in the feeding of female and castrated and intact male cattle and sheep, but it can also be used with male ruminants if raised for meat production. Other uses include breeding stock and replacements. The method is preferably used with steers and heifers for beef production, and with wethers, rams, and ewes for lamb meat production and/or wool production. When the method is applied to sheep, improvements in meat production in relation to protein intake and/or increased wool production can be obtained. With mature sheep which are primarily being raised for wool production, the benefit of increased wool production in relation to protein intake is especially valuable. For meat production, with either beef cattle or sheep, an additional advantage can be reducing the cholesterol content of lean meat, and also probably improving carcass quality or grade. For all ruminants improvement in T lymphocyte function is obtainable.

Veal Calves

This invention is also usable with calves being raised for veal production. Technically such veal calves are not ruminants. They are suckling calves which remain monogastric, i.e., they do not develop a rumen, being fed milk or a milk substitute which provides a balanced diet for the veal calves. KIC fed to veal calves is therefore not subject to rumen loss.

From 1 to 100 mg KIC (NaKIC basis) per kg body weight per 24 hrs. can be used. Preferred KIC amounts are 2 to 50 mg (NaKIC basis) per kg body weight per 24 hrs. On a feed basis, a liquid milk replacer for veal calves may contain from 0.01 to 0.5% (NAKIC basis) KIC based on the dry matter content of the milk replacer, and preferably from 0.01 to 0.5% KIC on the same basis. Sodium KIC is preferred because of its water solubility. The limitations on leucine in the diets for the veal calves are preferably observed, as previously described.

Lactating Domestic Mammals

The method and feed compositions of this invention are applicable to dairy cattle being managed for commercial milk production, and the method and feed compositions can also be advantageously used with lactating goats fed for commercial milk production. In addition, the invention provides a means for improving the milk produced by nursing mammals, including cattle, sheep, goats, horses, and swine. The young mammals being nursed thereby obtain the benefits of greater milk production and increased butterfat content. All of the foregoing instructions about the form and amount of KIC are applicable. However, it will be understood that the feeds employed can be adapted for the particular animal and the purpose for which it is being raised.

The following diets are illustrative of those for use with lactating animals when employing unprotected KIC.

DIET A

Complete Dairy Cattle Ration

Feed each cow
12 lbs early bloom alfalfa hay (17.5% crude protein, dry matter basis)
40 lbs corn silage
+4.3 lbs grain mix for each 10 lb milk (3.5% fat) produced in excess of 25 lb. milk)
For grain mix, blend together:

| | | lbs. ton |
|---|---|---|
| 51% | coarse ground yellow corn | 1020 |
| 13% | coarse ground oats | 260 |
| 30% | solvent-soybean meal (44%) | 600 |
| 3% | cane molasses | 60 |
| 0.5% | dicalcium phosphate | 10 |
| 0.5% | calcium carbonate | 10 |
| 0.5% | salt | 10 |
| 1.3% | trace mineral-vitamin mix | 6 |
| 1.2% | Ca—KIC (unprotected) | 24 |
| | | 2000 |

DIET B

Feed Concentrate for Lactating Sheep or Goats

To be used with sheep or goats being fed a 14% C.P. (d.m. basis) alfalfa-grass mixed hay ad lib. Feed 2.3 lbs concentrate per day to sheep weighing 130 lbs and nursing twins. Animals fed 2.3 lbs will consume 20 g Ca-KIC per day. This is about 0.8% of the total ration dry matter intake.

For concentrate, mix together and pellet:

| | | pounds/ton |
|---|---|---|
| 89.5% | ground yellow corn | 1790 |
| 6.5% | solvent-soybean meal (44%) | 130 |
| 0.9% | dicalcium phosphate | 18 |
| 0.3% | calcium carbonate | 6 |
| .5% | salt | 10 |
| .3% | Trace mineral-vitamin mix | 6 |
| 2.0% | Ca—KIC (unprotected) | 40 |

DIET C

Lactating Swine Ration*

Mix:

| | | pounds/ton |
|---|---|---|
| 84% | Ground yellow corn | 1680 |
| 13% | solvent-extracted soybean meal (48.5%) | 260 |
| 0.8% | calcium carbonate | 16 |
| 1.1% | dicalcium phosphate | 22 |
| 0.5% | iodized salt | 10 |
| 0.5% | trace mineral-vitamin mix | 10 |
| 0.1% | Na—KIC (unprotected) | 2 |

*15.6% CP, d.m. basis

Broiler Chickens

The KIC feeding method of this invention is particularly suitable for use in raising "broilers", which are chickens usually marketed around 10 weeks of age. It is also applicable to the raising of capons. In addition to improving the rate of weight gain, the feeding method of this invention may reduce the cholesterol content of the meat in the finished chickens. This cholesterol reducing effect becomes more pronounced as the protein content of the diet is increased, being especially marked with diets containing more protein than normally required for the growth stage of the chickens.

The chicken feed compositions will usually be composed of mixtures of feed ingredients, including protein-providing ingredients. The feed compositions may comprise complete feeds or feed concentrates. The feed preferably should contain at least a normally adequate amount of protein for the age of the chickens. Diets essentially deficient in protein should be avoided. Starter feeds containing at least 22% protein by weight (feed dry basis) are preferred for 0 to 4 weeks of age. Finishing rations used from 5 weeks on may contain a lesser amount of protein, but preferably contain at least 18% protein. For optimized results, it is also believed desirable to include only limited quantities of proteinaceous feed ingredients which are high in leucine content. For the purpose of the present invention, it is preferred to limit the amount of leucine in the diet of the chickens to not over 12% by weight based on the dry weight of the total protein being consumed, and preferably less than 10% by weight.

The method of this invention as applied to young chickens comprises orally administering at least 0.01 and preferably at least 0.05 weight percent (wt %) of alpha-ketoisocaproate (KIC), based on the dry weight of the total diet. (The amount of KIC is referenced to sodium KIC and its molar equivalents.) In preferred embodiments, the amount of KIC administered to the chickens is from 0.05 to 0.1 up to 0.5 wt % KIC (sodium KIC basis) based on the dry weight of the feed consumed by the chickens. Higher levels of KIC, such as in the range from 0.5 to 1%, could be used but have not been found to provide any added benefit.

When KIC is combined with the feed material as a uniform admixture, and the feed composition is intended to provide substantially the complete diet of the chickens, the amount of KIC may be specified in relation to the feed composition. For example, admixed feed compositions may contain from 0.05 to 1.0% wt % KIC (sodium KIC basis) in relation to the dry weight of the feed composition. In preferred embodiments for the formulation of complete feeds, the feed compositions preferably contain from 0.1 to 0.5 wt % KIC (sodium KIC basis) of the feed dry weight. The feed compositions also preferably contain at least an adequate amount of protein.

Illustrative feed compositions for use in practicing the present invention with young chickens are set out below. The compositions are specially designed for use with chickens being raised for broiler production. Ration A is designed for use from 0 to 4 weeks of age, and Ration B from 4 to 6 or 4 to 8 weeks of age. NaKIC or CaKIC is added to these rations in amounts on a dry matter basis equal to 0.1 to 0.2 wt. %.

RATION A
(23% protein)

| Ingredients | Weight (lbs) |
|---|---|
| Ground Corn | 282.25 |
| Soybean Meal | 184.25 |
| Calcium Carbonate | 6.25 |
| Dicalcium Phosphate | 8.50 |
| Fat | 6.25 |
| MHA[1] | 1.07 |
| Premix[2] | 11.43 |
| TOTAL lbs. | 500.00 |

[1] Methionine hydroxy analogue.
[2] Set out below.

RATION B
(18% Protein)

| Ingredients | Weight (lbs) |
|---|---|
| Ground Corn | 350.75 |
| Soybean Meal | 119.50 |
| Calcium Carbonate | 9.75 |
| Dicalcium Phosphate | 7.50 |
| Premix[1] | 11.43 |
| Solulac[2] | 1.07 |
| Total lbs. | 500.00 |

[1] Set out below.
[2]

Premix Composition

| | |
|---|---|
| Vitamin A-30 | 234 grams |
| Vitamin $D_3$-40 | 54 grams |
| Vitamin K-16 | 63 grams |
| Vitamon E-125 | 36 grams |
| Riboflavin | 135 grams |
| Niacin | 63 grams |
| Calcium Panothanate | 27 grams |
| Choline | 1.33 lb. |
| Vitamin $B_{12}$ | 76.5 grams |
| Folic Acid | 4.5 grams |
| Nutrigard | 1.0 lb. |
| Methionine Analogue | 180 grams |
| Trace Minerals | 270 grams |
| Salt | 5 lbs. |
| Carrier | 35.5 lbs. |

Laying Chickens

As applied to laying chickens, the method of this invention can have beneficial effects on both the quantity and quality of the eggs laid. The number of eggs laid can be increased. In addition it has been found that the cholesterol content of the egg yolks can be reduced. Both of these advantages can be important in connection with commercial egg production.

KIC powders can be mixed with dry feeds for dry feed compositions or the water-soluble KIC salts can be administered by dissolving in drinking water. Sodium KIC is preferred, and it is preferred to mix the dry KIC salt with the dry chicken feed ingredients at predetermined concentrations. The KIC salt can be incorporated by using standard mixing and blending equipment. KIC is probably substantially uniformly distributed throughout the feed. After mixing, if desired, the feed material may be further processed, such as by conversion to pellets.

As previously described, complete feed compositions or diets for the laying chickens preferably contain not over 12% leucine based on the total protein being consumed, and less than 10% by weight leucine is believed to be optimum. The amount of KIC to be administered to the laying chickens is in general from 0.01 to 1.0 weight percent (wt %) of KIC based on the dry weight of the total feed diet. This amount of KIC is referenced to sodium KIC and its molar equivalents. In preferred embodiments, the amount of KIC administered to the laying chickens is from 0.05 to 0.5 wt % KIC (sodium KIC basis) on the dry weight of the feed consumed by the chickens, such as 0.1 to 0.2% NaKIC.

When KIC is combined with the feed material as a uniform admixture, and the feed composition is intended to provide substantially the complete diet of the chickens, the amount of KIC may be specified in relation to the feed composition. For example, admixed feed compositions may contain from 0.01 to 1.0 wt % KIC (sodium KIC basis) in relation to the dry weight of the feed composition. In preferred embodiments for the formulation of complete feeds, the feed compositions preferably contain from 0.05 to 0.5 wt % KIC (sodium KIC) based on feed dry weight. Such feed compositions will usually contain at least 10% protein and may contain up to 18% protein (N×6.25).

Cattle Shipping

When cattle are to be transported they thereby become subject to the bovine respiratory disease complex known as "shipping fever", and administration of KIC can be of value in counteracting the increased plasma cortisol that has been found to be associated with shipping stress. Cattle, which may be beef cattle or dairy cattle, can be fed KIC as an additive to their feed for several days prior to shipment, such as preferably at least 5 to 10 days, if the cattle have not been regularly receiving KIC-containing feeds. For the purpose of counteracting increased cortisol, the amount of KIC administered can be increased over that used for regular feeding. For example, it is believed that it would be desirable to orally administer at least 2 to 50 milligrams of rumen-protected KIC (sodium KIC basis) per kilogram of body weight per 24 hours and to continue the administration for at least five days prior to shipment. For maximum effect, rumen-protection of the KIC is desirable, as previously described. If sodium KIC is used in unprotected form, the amount orally administered may be increased up to 20 to 500 mg KIC (NaKIC basis) per kilogram of body weight per 24 hours.

Alternatively or additionally to oral administration of KIC for counteracting shipping fever, the KIC may be parenterally administered, such as by intramuscular injection. Unprotected KIC can be used. It will probably be preferable to administer two or more injections on successive days prior to shipment. The injections may be prepared in a sterile aqueous solution of sodium KIC, and may contain from 50 to 4000 milligrams of sodium KIC per dose.

For a period of several days after shipment, such as 5 to 10 days, administration of KIC may be continued by oral feeding. It is believed that this will also be of value in reducing the adverse effects of shipping stress. The amount of rumen-protected KIC to be used in the feeds for post-shipment administration can range from 0.50 to 50 milligrams KIC (sodium KIC basis) per kilogram of body weight.

The method, feed composition, and results obtainable by the present invention are further illustrated by the following experimental examples.

EXPERIMENTAL EXAMPLES

Lamb Trials

The lambs used in Trial 1 consisted of medium-frame crossbred wethers and ewes weighing 26 to 31 kg. The lambs used in Trial 2 consisted of medium-framced crossbred rams weighing 18 to 25 kg. Each animal was raised as a single. The lambs were housed in a temperature controlled room in individual pens with nipple waterers. When received, the lamps were vaccinated for enterotoxemia. They were allowed to adjust to the pens and the environment for 10 days. One day before the trial began, the lambs were sheared and placed on their respective dietary treatments. The lamps were allotted blocking by weight and sex into two dietary treatment groups. Growth and feed consumption were measured bi-weekly. All lamb weights were taken after a 12 to 16 hour fast. The animals were slaughtered at 50 kg in the Iowa State University Meat laboratory facilities at Ames, Iowa. At slaughter, the lamb's internal organs and wool were weighed and sampled, loin eye area and back fat measured, and carcasses separated into fat, lean, and bone.

The SMB (soybean meal-containing) and the CGM (corn-gluten-containing) diets (compositions given in Table A) were fed twice per day in quantities ensuring that feed was before the lambs at all times. The diets were calculated to be equivalent to each other with respect to metabolizable protein, ether extract, fiber, and minerals with the exception of calcium and phosphorus. The CGM diet contained less calcium (0.68 v. 0.74%) and phosphorus (0.30 v. 0.47%), and had a higher calcium to phosphorus ratio (2.29 v. 1.57) than the SMB diet. The CGM diet was calculated to contain slightly more energy (TDN 81.7 vs. 79.0, NEm 1.88 v. 1.86, Neg. 1.23 vs. 1.22). Chemical analysis indicated that the CGM diet contained slightly more crude protein on a dry matter basis than did the SBM diet (20.5 v. 19.8%). The soybean meal ingredient contained about 3.5 wt % leucine, while the corn gluten meal ingredient contained about 15 wt % leucine. The CGM diet was therefore higher in leucine than the SBM diet, containing an estimated 16 wt % leucine as compared with an estimated 8 wt % leucine based on total crude protein in the diet.

TABLE A

| Feed Ingredients | Diets[1] | | | |
| --- | --- | --- | --- | --- |
| | SBM[2] | SMB[2] & KIC[3] | CGM[4] | CGM[4] & KIC[3] |
| Molasses (liquid) | 5.0 | 5.0 | 5.0 | 5.0 |
| Corn (fine ground) | 48.5 | 48.5 | 48.5 | 48.5 |
| Soybean Meal (expeller) | 25.0 | 25.0 | — | — |
| Corn Gluten Meal | — | — | 17.4 | 17.4 |
| Alfalfa (dehydrated) | 20.0 | 20.0 | 20.0 | 20.0 |
| Corn Starch | — | — | 7.1 | 7.1 |
| Corn Oil | — | — | 0.5 | 0.5 |
| Limestone | 8.0 | 7.0 | 8.0 | 7.0 |
| Salt | 0.5 | 0.5 | 0.5 | 0.5 |
| Trace Mineral | 0.02 | 0.02 | 0.02 | 0.02 |
| Vitamin A | 0.1 | 0.1 | 0.1 | 0.1 |
| Ketoisocaproate (Ca)[5] | — | 1.0 | — | 1.0 |
| ANALYZED COMPOSITION: | | | | |
| Crude Protein | 19.8 | 19.8 | 20.5 | 20.5 |
| Dry Matter | 88.9 | 88.9 | 89.8 | 89.8 |

TABLE A-continued

| | Diets[1] | | | |
|---|---|---|---|---|
| Feed Ingredients | SBM[2] | SMB[2] & KIC[3] | CGM[4] | CGM[4] & KIC[3] |
| % Leucine | 8.5 | 8.5 | 15.8 | 15.8 |

[1]Feed ingredients given on wt % basis.
[2]Soybean-meal containing diets.
[3]Diets containing calcium salt of alpha-ketoisocaproate (KIC).
[4]Corn gluten meal containing diets.
[5]KIC was mixed into the diets weekly at the level shown.

The results of Trial 1 are summarized below in Table B

TABLE B

| PROTEIN KIC | ADG[2] | F/G[3] | WOOL[4] | BACK FAT[5] | LEAN[6] | CORTISOL[7] | CHOLESTEROL[8] TISSUE | PLASMA |
|---|---|---|---|---|---|---|---|---|
| SBM 0 | .33 | 5.04 | .176 | .26 | 6.2 | .99 | 80 | 32 |
| SBM 1% | .36 | 4.82*[1] | .216* | .22 | 6.8 | .83* | 44 | 23 |
| CGM 0 | .37 | 4.53 | .158 | .20 | 5.9 | 1.04 | 40 | 33 |
| CGM 1% | .30 | 5.20* | .167* | .18 | 6.0 | .65* | 32 | 32 |

[1]Statistical analysis: *designates $p < .05$, a significant difference between 0% and 1% KIC.
[2]Average daily (24 hrs.) gain (kilograms).
[3]Kilograms feed per kilogram weight gain.
[4]Amount of wool in grams.
[5]Amount of back fat in inches.
[6]Amount of lean meat in kilograms.
[7]Amount of cortisol in plasma (ng/ml).
[8]Amount of cholesterol in lean tissue (ng/mg) and plasma (ng/ml).

The results of Table B indicate that the KIC increased gain and feed efficiency in the SBM diets. The CGM diets did not perform as well when supplemented with KIC, but KIC increased wool growth in both SBM and CGM diets. Cortisol was significantly lower in all the KIC supplemented diets.

The results for Trial 2 are summarized below in Table C. The results of Table C show that KIC improved performance in the SBM diet but poorer performance was observed in the CGM diet. Wool growth was improved with KIC supplementation in both diets. Cortisol was significantly lower in the KIC supplemented sheep.

TABLE C

| PROTEIN KIC | ADG[2] | F/G[3] | WOOL[4] | BACK FAT[5] | LEAN[6] | CORTISOL[7] | CHOLESTEROL[8] | LYMPHOCYTE BLASTOGENESIS[9] |
|---|---|---|---|---|---|---|---|---|
| SBM 0 | .304 | 4.76 | .213 | .26 | 5.9 | 2.70 | 75.2 | 5993 |
| SBM 1% | .339*[1] | 4.17* | .267* | .21 | 5.4 | 2.25* | 83.2 | 14625* |
| CGM 0 | .333 | 4.17 | .262 | .29 | 6.1 | 3.77 | 92.2 | 6134 |
| CGM 1% | .308* | 4.35 | .294* | .20 | 5.8 | 2.43* | 81.2* | 18102* |

[1]-[8]See Table B, except cholesterol data is for lean tissue only.
[9]Lymphocyte blastogenesis measured by amount of $^3$H—thymidine incorporated per 2 hrs. of incubation in the presence of phytohemaglutinin (a mitogen that stimulates T-lymphocyte division).

EXAMPLE II

Dairy Cattle Trial

Eight Holstein and four Brown Swiss cows were assigned randomly (blocking for lactation number and breed) to either a control or treatment group. Four of the Holsteins and two of the Brown Swiss were in their first lactation and all cows were between 134–283 days into lactation (mid-lactation). Cows were milked twice daily (2:30 a.m. and 2:00 p.m.).

Cows were fed ad libitum a total mixed ration twice daily (7:30 a.m. and 5:30 p.m.) with feed refusals collected before the morning feeding. The diet consisted of 31% chopped alfalfa hay, 18% corn silage, and 41% grain mix (as a % of the dry matter). The grain mix was calculated to contain 1.55 Mcal NE/kg dry matter and 16% crude protein. A major portion of the grain protein was from expeller processed soybean meal with higher than usual bypass characteristics. The cows were consuming protein in excess of their normal requirements. The grain ration contained an estimated 10% leucine (total protein basis), and the complete diet contained an estimated 9% leucine (total protein basis).

During the treatment period half the cows received Na-KIC at 0.75% of the diet dry matter. KIC was fed in a mixture which consisted of Na-KIC, corn gluten meal, hydrogenated soy oil and paraffin in a ratio of 2:1.0:0.1:0.1. The mixture was extruded and formed into crumbles. At least part of the KIC may have escaped rumen degradation with this treatment. Additionally, 100 units of tocopherol were added per gram of Na—KIC to prevent oxidation of KIC. Control animals were fed an equivalent amount of the same mixture but without KIC added.

During the first two weeks of the experiment (control period; designated weeks −2 and −1), all cows received the same diet. The trial period extended over the next three weeks (weeks 1, 2, 3) during which cows received either the KIC or control mix top-dressed on their diets twice per day (half the dose in the morning, half in the evening). Throughout the experiment, daily milk yield, milk composition, and feed consumption was measured for each cow. At the end of the control period and at the end of the treatment period, uninary catheters were inserted and total urine and fecal collections were made for 48 hrs. Results of production and nitrogen balance studies were analyzed statistically using each cow as her own control. The trial effect was measured by subtracting the average control period value from the value during the treatment period. ANOVA was used to detect differences between the KIC-fed and control groups.

The results are presented below in Table B. In summary, feed intake and body weight are not affected by KIC supplementation. Cows fed KIC had higher milk yields (+5%, $p<2$), with a higher percent milk fat (+4%, $p<0.04$) than control cows. The resulting milk fat yield was increased 10% ($p<0.02$) above the controls. Milk from cows fed KIC also tended to contain less cholesterol than milk from controls. Nitrogen balance data suggests more efficient utilization of dietary nitrogen by KIC-treated animals.

TABLE B

| | Diet | Pre | Post | Change (Pre-Post) | KIC effect | % Change | Sig. Level |
|---|---|---|---|---|---|---|---|
| Nitrogen Component | | | | | | | |
| Feed intake (g N/day) | control | 492 | 529 | +37 | −9 | −2% | NS |
| | KIC | 538 | 566 | +28 | | | |
| Urine output (g N/day) | control | 180 | 195 | +15 | −15 | −85 | NS |
| | KIC | 186 | 186 | 0 | | | |
| Feces output (g N/day) | control | 173 | 174 | +1 | −8 | −4% | NS |
| | KIC | 186 | 180 | −6 | | | |
| Body storage (g N/day) (N balance) | control | 23 | 41 | +18 | +8 | +24% | NS |
| | KIC | 34 | 60 | +26 | | | |
| Milk output (g N/day) | control | 115 | 118 | +3 | +6 | +5% | NS |
| | KIC | 131 | 140 | +9 | | | |
| Milk Parameters: | | | | | | | |
| Milk yield (kg/day) | control | 20.0 | 19.9 | −.13 | +1.10 | +5.1% | p < .15 |
| | KIC | 23.0 | 23.9 | +.97 | | | |
| Milk fat percent | control | 3.89 | 3.92 | +.03 | +.17 | +4.3% | p < .04 |
| | KIC | 4.07 | 4.27 | +.21 | | | |
| Milk protein percent | control | 3.40 | 3.53 | +.13 | −.03 | −.08% | NS |
| | KIC | 3.35 | 3.46 | +.11 | | | |
| Milk fat yield (kg/day) | control | .77 | .77 | +.00 | +.09 | +10.4% | p < .01 |
| | KIC | 92 | 1.00 | +.09 | | | |

EXAMPLE III

Laying Chickens

Laying hens (69 weeks of age) were randomly assigned to either a control diet or a diet containing 0.2 wt % KIC (Na). For the next 28 days feed consumption was recorded and eggs collected. Eggs were weighed and analyzed for egg yolk cholesterol. The feed composition is shown in Table C and the results in Table D. The total protein was about 18% on a dry matter basis, and the amount of leucine was about 9% of the protein. The control diet was the same except for the omission of the KIC.

TABLE C

| Ingredients | lbs/1000 lbs. |
|---|---|
| KIC (Na salt) | 2.0 |
| Corn (fine ground) | 672.5 |
| Soyabean meal (48% protein) | 214.0 |
| Meat & bone meal (50% protein) | 20.0 |
| Animal fat | 15.0 |
| Limestone (powder) | 60.0 |
| Dicalcium phosphate | 10.0 |
| D,L methionine | 0.5 |
| Vitamin premix | 5.0 |
| Salt & trace minerals | 3.0 |

TABLE D

| No. Birds | Average No. Eggs/Hen | Feed Average (gms/ hen/day) | Av. Eggs (kg./hen) | Avg. yolk Cholesterol (mg/100 gms) |
|---|---|---|---|---|
| 16 Control | 17.7 | 109 | 1.105 | 1068 |
| 16 Fed KIC | 19.5 | 109 | 1.233 | 996 |
| % Change | +10.2 | 0 | +11.1 | −7 |

The foregoing diet with KIC is indicated as a desirable ration for commercial use to increase egg production with the same amount of feed, and/or to reduce egg yolk cholesterol.

EXAMPLE IV

Study of Immune Function

A study was conducted to determine if KIC administration can alter white blood cell function, specifically T lymphocyte function, in growing sheep and cattle. Eighteen medium-framed crossbred male lambs were used in experiment 1. Lambs were randomly assigned to either a control diet (n=10) or a diet supplemented with 1% KIC (n=8). Animals were fed ad libitum in individual cages. At 100 and 108 days of treatment, 50-ml blood samples were collected for lymphocyte and neutrophil function tests.

In experiment 2, 19 intact crossbred male lambs were randomly assigned to either a saline treatment group (n=9) or a KIC treatment group (n=10). Control lambs were injected with 50 ml of a saline solution, and KIC treated lambs were injected with 50 ml of a 5% solution of KIC (sodium salt) daily (~2.5 g KIC/day). All injections were made intraperitoneally in the right posterior abdominal region after disinfection of the area. At day 60 and day 66 of treatment, blood was collected for lymphocyte and neutrophil function tests.

In experiment 3 72 castrated male cattle were allotted to 12 pens of 6 animals each. Three pens were assigned to each treatment: 0.0% KIC, 0.02% KIC, 0.07% KIC, and 0.20% KIC. Animals were fed ad libitum the respective diets for 6 weeks. At the end of the 6–233k periods, 100-ml blood samples were collected from each animal, and lymphocyte and neutrophil function were evaluated.

Sheep in experiments 1 and 2 were fed diets based on a mixture of 48% corn, 5% molasses, 20% alfalfa meal, 0.8% limestone, 0.6% salt-mineral-vitamin mix and ~25% of a protein supplement (either soybean meal, corn gluten meal, or corn gluten feed). The diets were isonitrogenous and analyzed to be ~20% crude protein and 89% dry matter. The KIC diet consisted of the basal diet to which was added 1% calcium-KIC, whereas the control diet was the basal diet plus 0.25% calcium carbonate.

The basal cattle diet (experiment 3) consisted of 49% corn, 24% corn-cobs, 18% soybean meal, 7% molasses, 1.3% limestone, 0.25% dicalcium phosphate, 0.23% salt, 0.02% trace-mineral premix, and 0.11% vitamin premix. The basal diet was supplemented with w/w 0.05% control pellets, 0.04% KIC pellets, or 0.4% KIC pellets. All animals consumed ~10 kg of feed per day, resulting in ~0, 2, 7, or 20 g of Ca-KIC consumed per animal per day or 0, 0.02, 0.07, and 0.2% KIC of the total diet.

KIC pellets were made by mixing zein, ethanol, KIC, limestone, bentonite, and water in a ratio of 8.3:7.4:5.2:3:2.1. This mixture was extruded through a die of 15 mm directly into a vat of liquid nitrogen. The shattered pellets were spread out and allowed to air-dry for 2 days. The pellets were coated with zein (2% w/w) by spraying with a 30% zein solution made in 80% ethanol. The pellets again were air-dryed. Control pellets were made similarly to the KIC pellets except that the mixture was zein, limestone, ethanol, bentonite, and water in a ratio of 12:12:7.5:2.7:1. When KIC pellets were placed in the rumen (nylon bag technique), 33% of the KIC added was present in the bags after 24 hr of rumen fermentation. It was estimated that uncoated KIC was 95% degraded in the rumen.

Blood was collected by jugular venapuncture into acid-citrate-dextrose anticoagulant. Lymphocytes and neutrophils were isolated, and lymphocyte blastogenesis and neutrophil function evaluated. KIC was obtained from SOBAC, Paris, France. Zein was purchased from Freeman Industries, Tuckahoe, NY. Each experiment was statistically analyzed by analysis of variance. In sheep experiments, individual animals were the experimental units, whereas pen means were analyzed in the cattle experiment.

The changes in lymphocyte blastogenesis are summarized in Table F. In all three experiments, average background blastogenesis was increased in KIC-treated groups. Addition of phytohemagglutinin (PHA) to the cells increased $^3$H-thymidine incorporation 10 to 30-fold over backgroun incorporation. In experiments 1, 2, and 3, KIC increased PHA stimulation by 280%, 150%, and from 8 to 85%, respectively. KIC increased Concanavalin A (ConA) stimulation of blastogenesis in cattle in a quadratic dose-responsive manner. No ConA stimulation occurred in sheep from either experiment. Similarly, KIC enhanced pokeweed mitogen (PWM) activity in cattle but not sheep fed KIC diets (quadratic effect). No significant changes in total white blood cell numbers or in the percentage that were segmented neutrophils were measured. The percentage of eosinophils tended to increase in sheep and cattle fed KIC, whereas they decreased in sheep injected with KIC. The percentage of lymphocytes was increased in experiment 2 and in the 0.02 and 0.07% KIC treated groups in experiment 3.

KIC did not alter neutrophil random migration, Staphylococcus aureus ingestion, cytochrome C reduction, iodination, or antibody-dependent cell-mediated cytotoxicity in any experiment, indicating that KIC does not alter neutrophil function. Feed intake in control and KIC-treated animals was not different in any experiment.

TABLE F

KIC Effects on Lymphocyte Blastogenesis in Young Sheep and Cattle.

| | Counts/min per 2 × 10$^5$ cells | | | | | Percent of Total WBC | | |
|---|---|---|---|---|---|---|---|---|
| | BKG[1] | PHA[1] | ConA[1] | PWM[1] | WBC[2] | % SEG | % LYM | % EOS |
| Experiment 1: Oral uncoated KIC. Sheep | | | | | | | | |
| Control (8)[3] | 466 | 6100 | 41100 | 19400 | 8.2 | 38 | 61 | .7 |
| KIC 1% (10) | 852 | 16800 | 44700 | 17300 | 8.5 | 39 | 59 | 1.7 |
| p<[4] | .008 | .003 | .81 | .77 | .61 | .89 | .34 | .12 |
| Experiment 2: IP injected KIC. Sheep | | | | | | | | |
| Saline (9) | 752 | 8500 | 31200 | 21600 | 10.6 | 41 | 48 | 3.4 |
| KIC (10) | 947 | 12600 | 33500 | 29400 | 10.4 | 34 | 61 | 1.7 |
| p< | .10 | .09 | .87 | .72 | .77 | .13 | .04 | .01 |
| Experiment 3: Oral coated KIC. Cattle | | | | | | | | |
| Control (3) | 1410 | 40500 | 40900 | 23100 | 8.0 | 28 | 52 | .7 |
| 0.02% KIC (3) | 1550 | 43200 | 48800 | 27100 | 6.8 | 29 | 63 | .9 |
| 0.07% KIC (3) | 2080 | 74300 | 75400 | 38000 | 7.4 | 24 | 69 | .7 |
| 0.20% KIC (3) | 1690 | 56900 | 54400 | 30500 | 8.2 | 24 | 52 | 1.1 |
| p< (quadratic dose response) | .26 | .003 | .001 | .05 | .41 | .48 | .04 | .69 |

[1]Background (BKG), phytohemagglutinin-stimulated (PHA), concanavalin A-stimulated (ConA), and pokeweed mitogen-stimulated (PWM) blastogenesis were determined by measuring the incorporation $^3$H thymidine into lymphocyte DNA, as described in Kaeberle, et al., Immunopharmacology (1984) 8:129-136.
[2]Total white blood cell number (WBC) is the cells per mm$^3$.
[3]Numbers in parentheses are the numbers of animals per treatment. In the cattle experiments there were 3 pens of 6 animals in each treatment.
[4]Significance is indicated as the probability of a greater F for the difference between control and treated sheep or for the quadratic dose response to KIC in cattle.

EXAMPLE V

Study of KIC Effect on Cortisol

To determine if KIC could acutely alter cortisol concentrations, young pigs were fed meals supplemented with leucine or KIC and plasma cortisol was measured.

In experiment 1, sixteen female pigs weighing 20-30 kg were used. Seven days before study, catheters were surgically placed in the right atria for blood sampling. Animals were housed in individual cages during the recovery period and had free access to water. Preceding the experiment, animals were fed twice daily a basal diet (2% of body weight per feeding). The basal diet consisted of a corn-soybean mix, adequate in all minerals and vitamins and containing approximately 14% crude protein. Test meals were formulated by additions to a basal diet. Five animals received the basal diet (control); five animals received the leucine meal, which had 2% leucine added to the basal diet; and six animals received the KIC diet, which had 2% KIC (sodium salt equivalent to 1.7% free acid) added to the basel diet. Studies were begun between 0800 and 0900 h after a 24-hr fast. Basal blood samples were taken at −20, −10 and −5 min. Animals were then offered 100 g of their respective test meal (time 0). Pigs were included in the study only if they consumed the entire meal in the first 20 min. Blood was sampled every 30 min from 120 to 240 min. Plasma was separated, Trasylol (FBA Pharmaceuticals, New York, NY) added (50 ul/ml), and plasma stored at −70 C. until analyzed.

Cortisol was measured by coated tube kits (Gammacoat, Travenol-Genetech Diagnostics, Cambridge, MA). Leucine and KIC were measured by high pressure liquid chromatography. Crystalline leucine was obtained from Sigma Chemical (St. Louis, MO) and KIC-sodium was obtained from SOBAC (Paris, France). Statistical analysis of the individual pig responses was conducted on mean plasma concentrations before the meal (−20 to 0 min) and after the meal (120 to 240 min). When the overall treatment F-value was significant, differences between individual treatments were determined using the pooled SEM and a T-test.

Table G presents the changes in plasma leucine, KIC and cortisol concentration in pigs before and after ingestion of control, leucine and KIC meals. Ingestion of the control meal resulted in a small significant increase in leucine concentration while plasma KIC concentration remained constant. Ingestion of the leucine meal caused plasma leucine concentration to increase 4 fold whereas KIC ingestion caused a doubling of leucine concentration. Plasma KIC concentration increased from a basal concentration of ~40 $\mu$M to 90 $\mu$M and over 100 $\mu$M in pigs fed KIC- and leucine-supplemented meals, respectively.

Plasma cortisol concentration did not change after the control meal (Table G). The addition of leucine to the diet resulted in a small decrease in plasma cortisol (−14%, nonsignificant). Addition of KIC to the diet, however, resulted in a 40% decrease in cortisol concentration by 240–300 minutes after the meal (p<0.01).

trial. The cattle were sold through a commercial beef processing plant when they were approaised by visual examination to grade Choice. Loin eye area and fat thickness over the loin were measured on each carcass. Quality and yield grades, and percent kidney, heart, and lepvic (KHP) fat were estimated by the federal graders.

Preliminary experiments indicated that uncoated KIC was 95% degraded in the rumen. Therefore, an attempt was made to protect KIC from ruminal degradation. KIC pellets, resistant to rumen degradation, were made by mixing zein, ethanol, KIC, limestone, bentonite and water in a ratio of 8.3:7.4:5.2:3:2:1. This mixture was extruded through a die of 15 mm directly into a vat of liquid nitrogen. The shattered pellets were spread out and allowed to air-dry for two days. The dried pellets were coated with zein (2% w/w) by spraying with a 30% zein solution made in 80% ethanol. The pellets again were air-dried. Control pellets were made similar to the KIC pellets except that the mixture was zein, limestone, ethanol, bentonite and water in a ratio of 12:12:7.5:2.7:1. When KIC pellets were placed in the rumen (nylon bag technique), 45% of the KIC added was present in the bags after 36 hr of rumen digestion.

KIC was obtained from SOBAC, Paris, France. Zein was purchased from Freeman Industries, Tuckahoe, N.Y. Each experiment was statistically analyzed by analysis of variance with three pens per treatment.

Results and Discussion

1. During the first 58 days of the trial, daily gain was

TABLE G

Plasma cortisol, leucine and ketoisocaporate (KIC) in pigs before (pre) and after (post) meals supplemented with leucine or KIC.

| Diet | n | Cortisol (ug/dl) | | | Leucine (uM) | | | KIC (uM) | | |
|---|---|---|---|---|---|---|---|---|---|---|
| | | Pre | Post | Change | Pre | Post | Change | Pre | Post | Change |
| Control | 5 | 3.9 | 3.8 | −0.09$^a$ | 130 | 184 | 53$^a$ | 36 | 33 | −3$^a$ |
| 2% leucine | 5 | 2.8 | 2.4 | −0.48$^a$ | 146 | 664 | 518$^b$ | 38 | 90 | 66$^b$ |
| 2% KIC | 6 | 4.7 | 2.9 | −1.99$^b$ | 121 | 312 | 182$^a$ | 47 | 102 | 56$^b$ |
| SEM (pooled) | | | | 0.49 | | | 109 | | | 10 |

Means with a different superscript are significantly different (p < 0.5)

EXAMPLE VI

Feedlot Steers

Seventy-two medium-frame steers, with an average weight of 578 lbs., were allotted to 12 pens of 6 animals each. A common basal diet was fed ad libitum to all cattle. This consisted of 48.9% cracked corn, 24.4% ground corn cobs, 17.8% expeller Soybean meal, 7.0% molasses (liquid), 1.3% limestone, 0.25% dicalcium phosphate, 2% salt, 0.02% trace mineral premix, and 0.1% vitamin A premix for the first 58 days of the experiment, and was changed to 54.3% cracked corn and 12.8% expeller soybean meal for the remaining 103 days of the experiment. Three pens were assigned to each treatment. The treatments consisted of four levels of Ca-KIC in a pelleted supplement: 0%, 0.02%, 0.07%, and 0.20% of the basal diet (0.05% control pellets, 0.04% KIC pellets, 0.14% KIC pellets, and 0.40% KIC pellets). The pellets were preweighted and top-dressed on the basal diet twice daily. After 58 days, the cattle on the 0.20% KIC were removed from the experiment. The cattle were not implanted with a growth promotant nor were ionophores included in the diet. The cattle were placed in the feedlot and fed a growing ration for 5 weeks prior to the start of the experiment. The cattle were weighed on 2 consecutive days at the beginning and end of the experiment, and every 14 days during the increased by 20% (p<0.07), 11% (NS), and 14% (p<0.18) for the 0.02%, 0.07% and 0.20% KIC treatments, respectively (Table H). Daily feed intake was not significantly altered. Feed conversion was improved 13% (p<0.05), 9% (p<0.17), and 10% (p<0.11) for the 0.02%, 0.07%, and 0.20% KIC treatments, respectively. Performance response to KIC occurred relatively shortly after KIC was administered, with the greatest response at 0.02% KIC.

2. Over the entire 161-day trial, daily gain was increased by 14% (p<0.01) and 7% (NX) for the 0.02% and 0.07% KIC treatments, respectively (Table I). Daily feed intake tended to be increased with increasing gains. Feed conversion was improved 8% (NS) and 6% (NS) for the 0.02% and 0.07% KIC treatments, respectively. While response to KIC was greater in the first 56 days of the trial, a significant response was maintained over the duration of the trial. The 0.02% KIC treatment continued to provide the greatest response, but again, the optimal dose may be below this level.

3. Carcass weight, dressing percent, loin eye area, backfat thickness, KHP fat, and yield grade were not altered by the addition of KIC to the diet. However, the number of cattle grading choice was increased by the addition of KIC to the diet.

4. One steer in the control group died and one steer was treated for sickness, whereas no animals from the KIC-treated groups died or were treated. There was one condemned liver in the control group and one in the 0.07% KIC treatment group.

5. While economic conditions will vary with time, the return per head in this trial was $50 greater for the KIC treated animals due to the increased gain and the greater number of cattle grading choice.

Summarizing, over a long-term trial, feeding KIC to growing steers increased daily gain up to 14% and improved feed conversion up to 8%, while increasing the number of carcasses grading choice. These factors, plus KIC's enhancement of immune function, demonstrates that KIC may have significant potential as a feed additive for growing feedlot cattle. The effect on cortisol reduction is shown in Table J.

TABLE H

Steer Performance (58 days)

| Item | % Dietary KIC | | | |
|---|---|---|---|---|
| | 0 | 0.2 | 0.07 | 0.20 |
| Starting wt., lb. | 578 | 578 | 577 | 580 |
| Ending wt., lb. | 756 | 786 | 770 | 779 |
| Daily gain, lb. | 2.80 | 3.36* | 3.12 | 3.19 |
| Daily intake, lb DM/day | 16.0 | 16.8 | 16.3 | 16.3 |
| Feed/Gain | 5.7 | 5.0** | 5.2 | 5.2 |

*$p < .1$
**$p < .05$

TABLE I

Steer Performance (161 Days)

| Item | % Dietary KIC | | |
|---|---|---|---|
| | 0 | 0.02 | 0.07 |
| Starting wt., lb. | 578 | 578 | 577 |
| Ending wt., lb. | 1016 | 1068 | 1035 |
| Daily gain, lb. | 2.66 | 3.03*** | 2.85 |
| Daily intake, lb DM/day | 21.2 | 22.6 | 21.6 |
| Feed/Gain | 8.0 | 7.4 | 7.5 |

***$p < .01$

TABLE J

| Plasma Cortisol in Steers at 150 days of the Experiment | |
|---|---|
| Dietary KIC % | Plasma Cortisol (kg/100 ml plasma) |
| 0% | 4.08 |
| .02% | 3.74 |
| .07% | 3.20 |

I claim:

1. The method of activating the blastogenesis function of the immune systems of domestic animals selected from the group consisting of cattle, sheep, goats and swine, comprising administering alphaketoisocaproate (KIC) to the animals, said KIC being in the form utilizable by the animals and being administered in an amount enhancing blastogenesis of their T lymphocytes.

2. The method of counteracting stress-associated plasma cortisol elevation in domestic animals selected from the group consisting of cattle, sheep, goats, and swine, comprising administering alpha-ketoisocaproate (KIC) to the animals, said KIC being in a form utilizable by the animals and being administered in an amount reducing their plasma cortisol.

3. The method of claim 2 in which said animals are cattle.

4. The method of claims 1 or 2 in which said KIC is selected from the group consisting of sodium KIC and calcium KIC.

5. The method of claims 1 or 2 in which said KIC is orally administered in admixture with an animal feed material.

6. The method of claims 1 or 2 in which said KIC is parenterally administered.

7. The method of claims 1 or 2 in which said animals are selected from the group consisting of cattle and sheep, and said KIC is administered in a rumen-protected form.

8. The method of claims 1 or 2 in which said KIC is sodium KIC.

9. The method of claims 1 or 2 in which said KIC is calcium KIC.

10. The method of claims 1 or 2 in which said animals are swine.

* * * * *